Sept. 27, 1966        T. N. SMITH        3,275,379

PROPULSION AID FOR MOTOR VEHICLES

Filed Feb. 3, 1964

INVENTOR.
THEODORE N. SMITH.

BY

ATTORNEY

United States Patent Office 3,275,379
Patented Sept. 27, 1966

3,275,379
PROPULSION AID FOR MOTOR VEHICLES
Theodore N. Smith, 454 S. Massey St., Watertown, N.Y.
Filed Feb. 3, 1964, Ser. No. 342,313
1 Claim. (Cl. 301—41)

This invention relates to the means in aiding in the propulsion for motor vehicles, and has for its object to provide a novel auxiliary aid, which is carried by the vehicle, and which is activated by the power of the vehicle's motor; for turning the drive wheels of the vehicle, either forward or backward, when the traction is too limited for performing the operation by means of the ordinary propelling mechanism. And a further object is to provide novel and simple means for operatively connecting parts of the auxiliary aid with the axle of the main driving shaft of the vehicle; whereby the power of the vehicle's motor is utilized for the propulsion aid in the propulsion of the vehicle.

Heretofore, in order to gain better traction for the drive wheels of the vehicle, it was necessary to use chains, snow tires, etc., and it has been a source of more or less trouble and inconvenience.

I attain these objects by means set forth in detail description, which follows, and as illustrated by the accompanying drawings.

My invention consists of a molded form-fitting drive wheels insert with splines attached and secured by the wheel studs and nuts, of motor vehicle. The number of splines, the width, thickness, will depend upon the make, model and type of vehicle.

Briefly, the operation of my propulsion aid is as follows: This aid is secured to the drive wheels in the same manner as the wheels themselves, using the same studs and nuts. When the drive wheels sink to a certain level in snow, sand, mud, etc., these extended splines take over; much in the same manner as a paddle is used to motivate a canoe.

In the drawings, wherein like reference characters indicate like parts:

Figure 1:
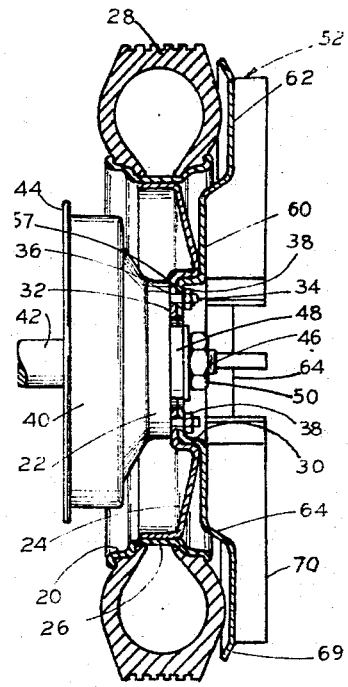
FIGURE 1 is a sectional view through a vehicle wheel showing the traction device secured thereto.
Figure 2:
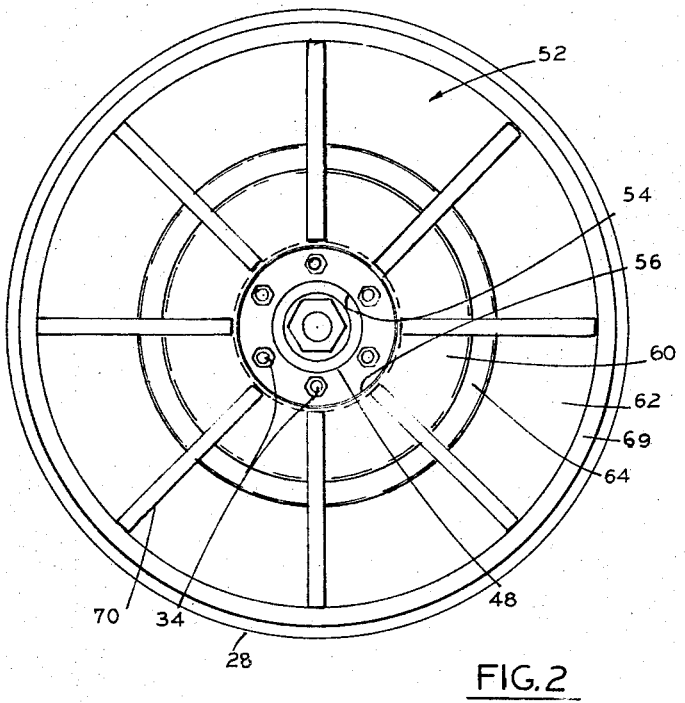
FIGURE 2 is a side view of the device applied to a wheel.
Figure 3:
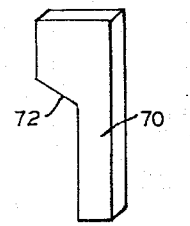
FIGURE 3 is a perspective view of a spline or paddle block.

Referring to the drawings there is shown the wheel mounting flange 22 for the wheel 20, comprising an annular disk 24, with drop center tire mounting rim 26, and pneumatic tire 28. The wheel disk 24 is provided with an annular recess 30 at the center, and an annular flange 32 which is attached to the mounting flange 22 by studs 34 projecting from the flange 22, the studs being threaded and projecting through corresponding apertures 36 in the wheel flange 32, and being provided with nuts 38. The wheel 20, mounting flange 22, and brake drum 40, rotate about the axle housing 42, which carries the brake backing plate 44. The drive axle 46 extends through the housing, and in practice has a tapered fit within the hub 48 of the mounting flange, and is keyed thereto, and the hub secured to the axle as by an axle nut 50. Such construction is well known to those skilled in the art.

The traction device 52 comprises a heavy sheet metal stamping having a central aperture 54 to clear the axle and hub, an annular recess 56 adapted to nest in the wheel recess 30, and having apertures 57 to receive the studs 34, whereby upon removal of the nuts from the studs, the device may be applied to the wheel, and the nuts replaced and drawn tight. The traction device has an annular flat portion 60, and a second outwardly offset annular flat portion 62 integrally joined to the portion 60, by a conical portion 64, having an angle in the order of 30 degrees from the wheel axis. The outer rim of the disk comprises an integral annular conical portion 69 disposed at an angle in the order of 60 degrees from the wheel axis.

A plurality of radial blocks 70, in the form of a cleat, paddle, or spline are affixed to the annular portions 60, 62, and conical portion 64, and are uniformly spaced angularly around the traction device. It will be seen that the conical offset 64, in combination with the blocks 70, with the offset edges 72 to fit the disk together with the annular offset formed by the recess, and the conical rim, all contribute to rigidify the traction disk, while providing clearance for the pneumatic tire mounted on the wheel rim.

In practice a traction disk will be affixed to each of the drive wheels of the vehicle, and the overall diameter will be such as to be normally spaced from the road pavement by a sufficient amount to permit the usual flexing of the pneumatic tire casing, in normal travel along the highway. However, should the highway be covered with snow of such depth as to stall or tend to stall the vehicle and interfere with the traction normally supplied by the drive wheels alone, the paddles of the traction device will be of sufficient length to dig into the snow, and supply the necessary additional traction to propel the vehicle. The devices will be effective in mud or sand, as well as snow, or whenever the wheel sinks into any soft accumulation a sufficient distance so that the paddles engage the accumulation.

It will be seen that the devices can be applied to the wheels or removed from the wheels without climbing under the car, the wheel nuts being readily accessible from the side of the car, once the usual hub cap of the wheel is removed and the wheel nuts exposed.

Having thus described my invention, what I claim as new, and desire to secure by Letters Patent, is:

A propulsion and traction aid for the drive wheels of motor vehicles comprising an annular one piece disk having outer and inner annular planar portions joined by a conical offset portion, whereby the inner planar annular portion is offset axially inwardly of the outer annular portion, said outer annular portion having an inwardly extending conical rim flange, and said inner annular portion, having a central annular recess portion offset inwardly of the inner annular planar portion and adapted to nest in the annular demountable stud recess of a demountable wheel, said annular recess offset having an annular planar flange provided with a central axle aperture and a plurality of stud receiving apertures disposed on a circle around the central aperture, and said disk having radial paddlelike blocks disposed uniformly angularly around the disk and each block having an edge having an offset corresponding to the offset of said disk, and being affixed to the inner and outer planar annular portions and conical offset portion, whereby the traction disk provides annular clearance for a wheel tire, and is rigidified by the conical offset and spaced paddles affixed to the disk.

References Cited by the Examiner
UNITED STATES PATENTS

| | | | |
|---|---|---|---|
| 1,384,170 | 7/1921 | Vincent | 301—43 |
| 2,559,721 | 7/1951 | Kruse | 201—47 |
| 2,714,042 | 7/1955 | Kelly | 301—47 |
| 2,735,723 | 2/1956 | Shireman | 301—44 |
| 2,830,847 | 4/1958 | Samaras | 301—47 |
| 2,986,190 | 5/1961 | Lamb | 152—216 |
| 3,014,547 | 12/1961 | Lely | 301—43 |

LEO FRIAGLIA, *Primary Examiner.*